United States Patent [19]

Shenk

[11] 4,294,531
[45] Oct. 13, 1981

[54] AUTO-FOCUS MOVIE CAMERA

[75] Inventor: Edwin K. Shenk, Westford, Mass.

[73] Assignee: Polaroid Corporation, Cambridge, Mass.

[21] Appl. No.: 79,052

[22] Filed: Sep. 26, 1979

Related U.S. Application Data

[63] Continuation of Ser. No. 899,785, Apr. 25, 1978, abandoned, which is a continuation-in-part of Ser. No. 729,289, Oct. 4, 1976, abandoned.

[51] Int. Cl.³ .............................................. G03B 3/10
[52] U.S. Cl. .................................. 354/195; 352/140; 318/563; 318/601; 318/624
[58] Field of Search ............... 318/600, 601, 611, 621, 318/624, 563, 645; 352/140; 354/25, 195, 196-201

[56] References Cited

U.S. PATENT DOCUMENTS

| | | | |
|---|---|---|---|
| 3,522,764 | 8/1970 | Biber et al. | 354/195 |
| 3,522,981 | 8/1970 | Kirstein et al. | 350/44 |
| 3,650,615 | 3/1972 | Aoki et al. | 353/101 |
| 3,752,969 | 8/1973 | Kiffmeyer et al. | 318/601 |
| 3,871,756 | 3/1975 | Steiringer et al. | 352/140 |
| 4,103,309 | 7/1978 | Massa | 354/195 |

*Primary Examiner*—L. T. Hix
*Assistant Examiner*—W. J. Brady

*Attorney, Agent, or Firm*—David R. Thornton

[57] ABSTRACT

The lens mount of a movie camera is automatically positioned to maintain an image of a subject in focus on a focal plane of a recording station by generating periodic range pulses having a characteristic directly related to subject range, and converting each pulse to a number which represents the focus position of the lens mount. Such number is stored in a first register whose contents vary in response to changes in subject distance at a rate dependent on the pulse repetition rate of the range pulses. The actual position of the lens mount is determined in the form of a second number which is stored in a second register whose contents vary in response to changes in the position of the lens mount at a rate determined by the rate of change of position. Rotation of a reversible motor is initiated when the contents of the registers are unequal, rotation being terminated when the contents are equal. The direction of rotation is in accordance with which of the two registers has the larger contents. Alternatively, rotation is initiated only after it is determined that the contents of one register exceeds the other over a majority of a predetermined number of range pulses, the direction of rotation being determined by which of the two registers has the larger contents a majority of the time over such predetermined number of range pulses.

13 Claims, 6 Drawing Figures

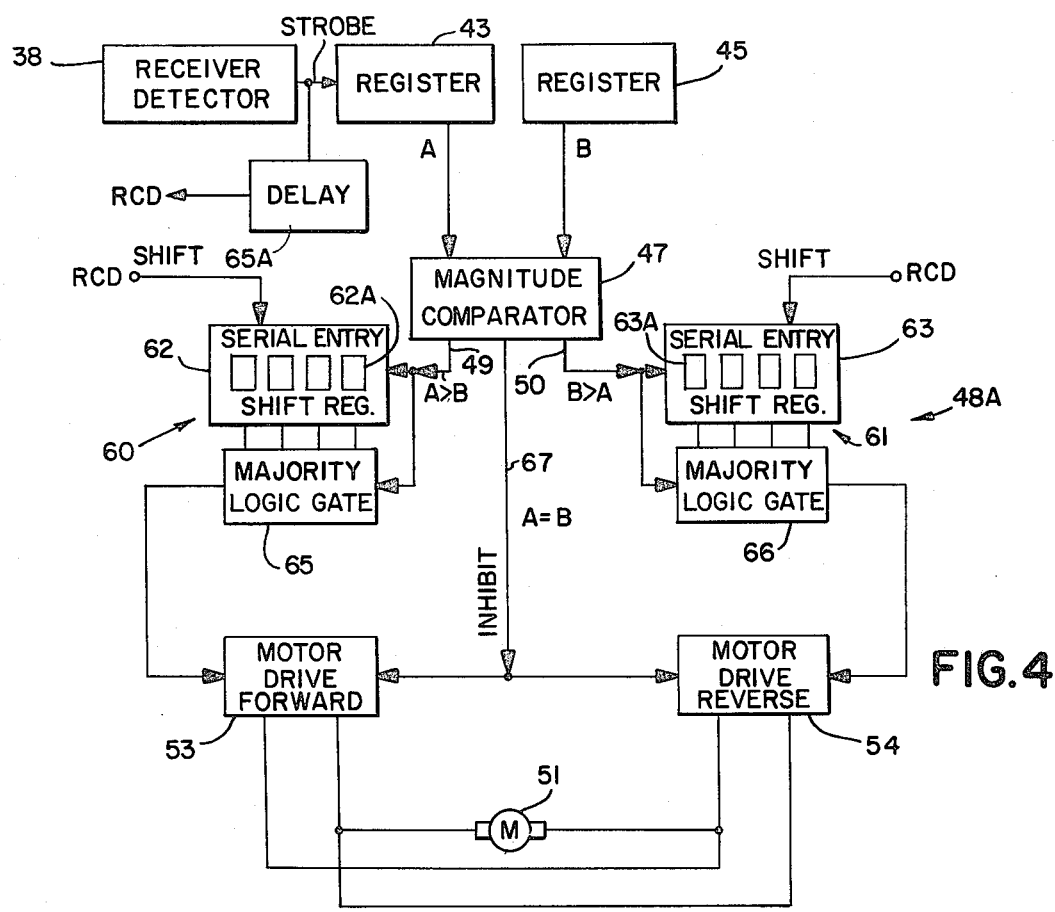
FIG.4
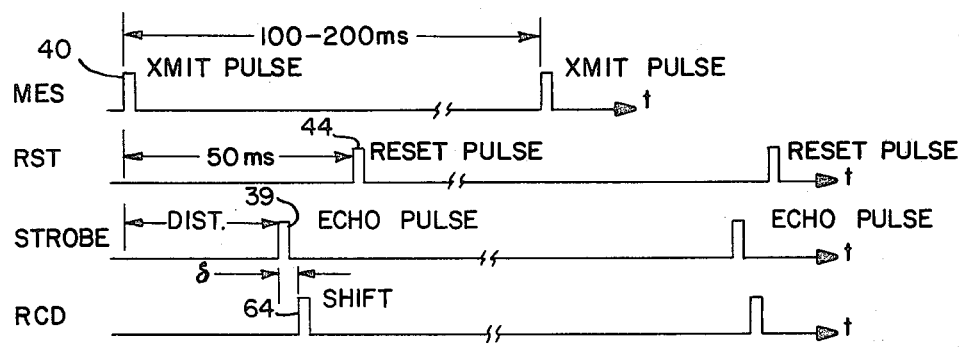
FIG.5
| SHIFT PULSE | CELL | A | B | A>B | B>A | SAMPLE |
|---|---|---|---|---|---|---|
| 5 | 1 | 1 | 0 | 1 | 0 | CURRENT |
| 4 | 2 | 0 | 1 | 0 | 1 | 1ST PREVIOUS |
| 3 | 3 | 0 | 0 | 0 | 0 | 2ND PREVIOUS |
| 2 | 4 | 1 | 0 | 1 | 0 | 3RD PREVIOUS |
| 1 | 5 | 1 | 0 | 1 | 0 | 4TH PREVIOUS |
|  |  |  |  | 3/5 | 1/5 |  |
GATE 65 HAS MAJORITY
FIG.6

AUTO-FOCUS MOVIE CAMERA

RELATED APPLICATIONS

This is a continuation of application Ser. No. 899,785, filed Apr. 25, 1978, now abandoned, which is a continuation in part of parent application Ser. No. 729,289, filed Oct. 4, 1976, now abandoned, the disclosure of which is hereby incorporated by reference.

BACKGROUND OF THE INVENTION

This invention relates to an automatic focusing system for a movie camera, and to a camera incorporating the same.

The parent application discloses an automatic focusing system for a movie camera wherein the lens mount is moved to a location, hereinafter called the focus location, at which an image of a subject is in focus on the focal plane of a recording station, in response to a range pulse generated on receipt of an echo from a subject illuminated with a supersonic burst transmitted from the camera. Arrival of the lens mount to its focus position keys the transducer and the cycle repeats allowing the lens mount to track a subject whose distance is changing. The tracking of a moving subject by the lens mount is consequently done in steps determined by the time required for the lens mount to move to its new focus position.

In the focusing system of the parent application, the range pulses define time intervals linearly related to subject distance by a fixed scale factor whereby the lens/subject function, which establishes the relationship between the distance of a subject and the position of the lens mount at which a subject at that distance is in focus, is parametrically related to time. The accumulated output of a scaled clock, whose pulse repetition frequency varies in accordance with the time derivative of an approximation of the lens/subject function, is the integral of the derivative of the function itself so that at the end of a time interval defined by a range pulse, the number of pulses produced by the scaled clock will be a number representing the focus position of the lens. This number representing the current focus position is stored in a register whose contents are subtracted from the contents of a register containing a number representing the previous focus position of the lens. The sign of the difference controls the direction of rotation of a reversible motor connected to the lens mount while the magnitude of the difference determines the distance the lens mount must move from the previous focus position to the new focus position. Thus, the absolute position of the lens mount (i.e., its position relative to a fixed position) is not known. Consequently, any error introduced in the actual positioning of the lens mount by a missed pulse, for example, during one ranging operation will remain during subsequent ranging operations.

It is therefore an object of the present invention to provide a new and improved automatic focusing movie camera having smooth and continuous lens movement.

Another object is to provide an automatic focusing system for a movie camera wherein errors that may be introduced during one ranging operation are eliminated by subsequent ranging operations.

SUMMARY OF THE INVENTION

An automatic focusing system according to the present invention involves generating periodic range pulses having a characteristic directly related to subject distance, whereby the focus position of the lens mount for each pulse is represented by a number, and storing such number in a first register. The contents of this register will thus vary in response to changes in subject distance at a rate dependent on the pulse repetition rate of the range pulses, and not in accordance with the time required for the lens mount to move from one focus position to another as in the case of the prior art as represented by FIG. 10A of the parent application.

The present invention also involves determining the actual position of the lens mount in the form of a number which is stored in a second register whose contents thus vary in response to changes in the position of the lens mount at a rate determined by the rate of change of position, and comparing the magnitudes of the contents of the registers to determine which register has the larger contents.

In one embodiment of the invention, rotation of a reversible motor is initiated when the contents of the registers are unequal and halted when the contents are equal. The direction of rotation is determined by which of the two registers has the larger contents. In another embodiment of the invention, rotation of the motor is initiated only after it is determined that the contents of one register exceeds the other over a majority of a predetermined number of range pulses, the direction of rotation being determined by which of the two registers has the larger contents a majority of the time over the predetermined number of range pulses. In the last-mentioned embodiment, rotation of the motor is inhibited when the contents of the register are equal.

By reason of providing for periodic range pulses to be generated, and for the contents of the first counter to be updated during the time that the lens mount is moving toward a position at which the subject will be in focus, movement of the lens mount will be smooth and continuous and not contain any step-wise discontinuities. Furthermore, any counting errors arising during a ranging operation will be corrected on subsequent ranging operations because the absolute position of the lens mount is utilized in its positioning. When taken together, all of the improvements in the automatic focusing system result in a more pleasing display of subjects whose distances change during filming.

BRIEF DESCRIPTION OF THE DRAWINGS

Embodiments of the invention are illustrated in the accompanying drawings wherein:

FIG. 4 is a block diagram of a different embodiment of the drive means shown in FIG. 3;

FIG. 5 is a composite timing diagram showing the relative positions of various pluses in the system; and FIG. 6 is a chart giving an example of the manner in which the majority logic operates in the embodiment of FIG. 4.

DESCRIPTION OF THE PREFERRED EMBODIMENTS

Figure 1:
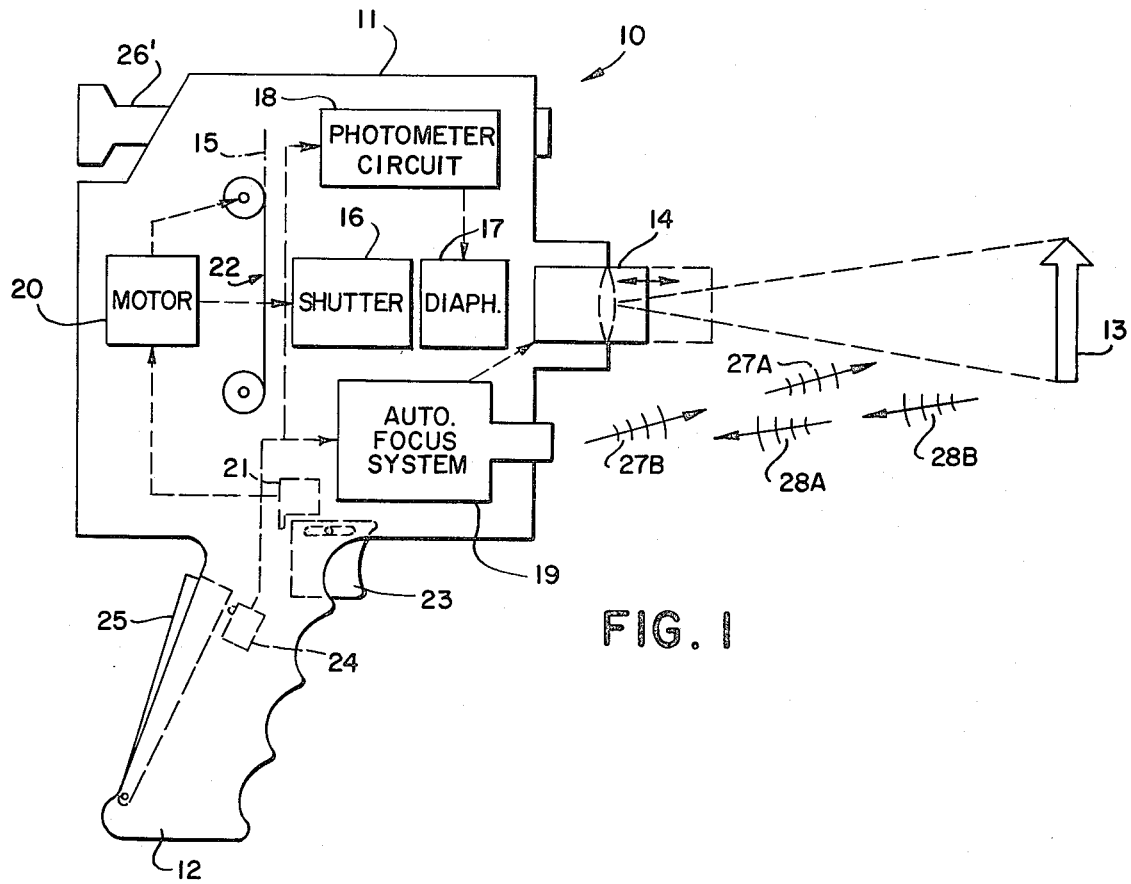
FIG. 1 is a side view of a movie camera showing a schematic of the present invention incorporated thereinto.

Referring now to FIG. 1, reference numeral 10 designates, in schematic form, an automatic focusing movie camera according to the present invention. Camera 10 comprises a housing 11, on the bottom of which is mounted a handle 12 by which a user holds the camera to record a subject 13 through an adjustable lens mount 14 that directs scene light to a focal plane 15 of a recording station when a shutter mechanism 16 is operated. A diaphragm 17 associated with the shutter mechanism 16, in conjunction with the lens mount 14, establishes the instantaneous amount of light incident on the focal plane 15. The diaphragm opening is controlled by an activatable photometer circuit 18 in response to scene light.

Also mounted within housing 11 is an automatic focus system 19 which, when activated, is responsive to the distance of the subject to the camera, and to changes in such distance for adjusting the position of the lens mount 14 such as to maintain the image of the subject 13 in focus on the focal plane 15. A switch 24 mounted in the camera handle 12 in connection to an energy source (not shown), controls the operation of the photometer circuit 18 and the automatic focus system 19 in accordance with pivotal movement of an actuator 25 as the handle is engaged by the heel of a user's hand when holding the camera in position to record a scene. Additionally, switch 24 also couples the battery to motor run switch 21 to permit scene recording as explained below.

Housing 11 also contains a motor 20 which, when energized through motor run switch 21 responsive to an actuator 23, simultaneously operates the shutter 16 and a film indexing claw (not shown) which intermittently drives the film 22 past the recording station located behind the shutter 16. Finally, a sighting tube 26 is provided for allowing the camera user to frame the scene being filmed.

In the operation of the camera 10, the user grasps the handle 12 and frames the subject 13 by means of the viewfinder 26. As the user holds the handle 12, the switch 24 is closed by the movement of the actuator 25 thereby powering the photometer circuit 18 and the automatic focus system 19. The photometer circuit establishes the proper diaphragm opening in accordance with the amount of light in the scene being photographed while the automatic focus system begins to transmit sequential bursts of ultrasonic energy toward the subject 13, such bursts being designated by reference numerals 27A and 27B in FIG. 1. These bursts are reflected by the subject 13 as indicated at 28A and 28B such that the reflected energy is received by the transducer of the automatic focus system.

It should be understood that the echo received from the subject 13 due to the interrogating burst 27A transmitted from the system 19 is received prior to the transmission of the subsequent interrogating burst 27B. That is to say, the automatic focus system of the present invention is like the system described in the parent application and is a mono-pulse system with a desired focus position of the lens being computed in response to each interrogating pulse.

As described in the parent application, the system 19 determines the time interval between transmission of an interrogating burst 27A and the return of its echo 28A for the purpose of establishing the distance of the subject 13 to the camera. Having established such distance, the system 19, when permitted, is effective to move the lens mount 14 toward a focus position in which an image of the subject will be focused on the focal plane 15 upon activation of shutter 16. As indicated previously, activation of the shutter 16 is selectively carried out when the user depresses trigger 23 thereby closing switch 21 and powering motor 20. On the other hand, the autofocus system 19 remains in operation as long as the user maintains his grasp of the handle 12, and is effective to continuously determine subject range and to cause the lens mount 14 to track changes in subject distance both prior to and during filming.

Figure 3:
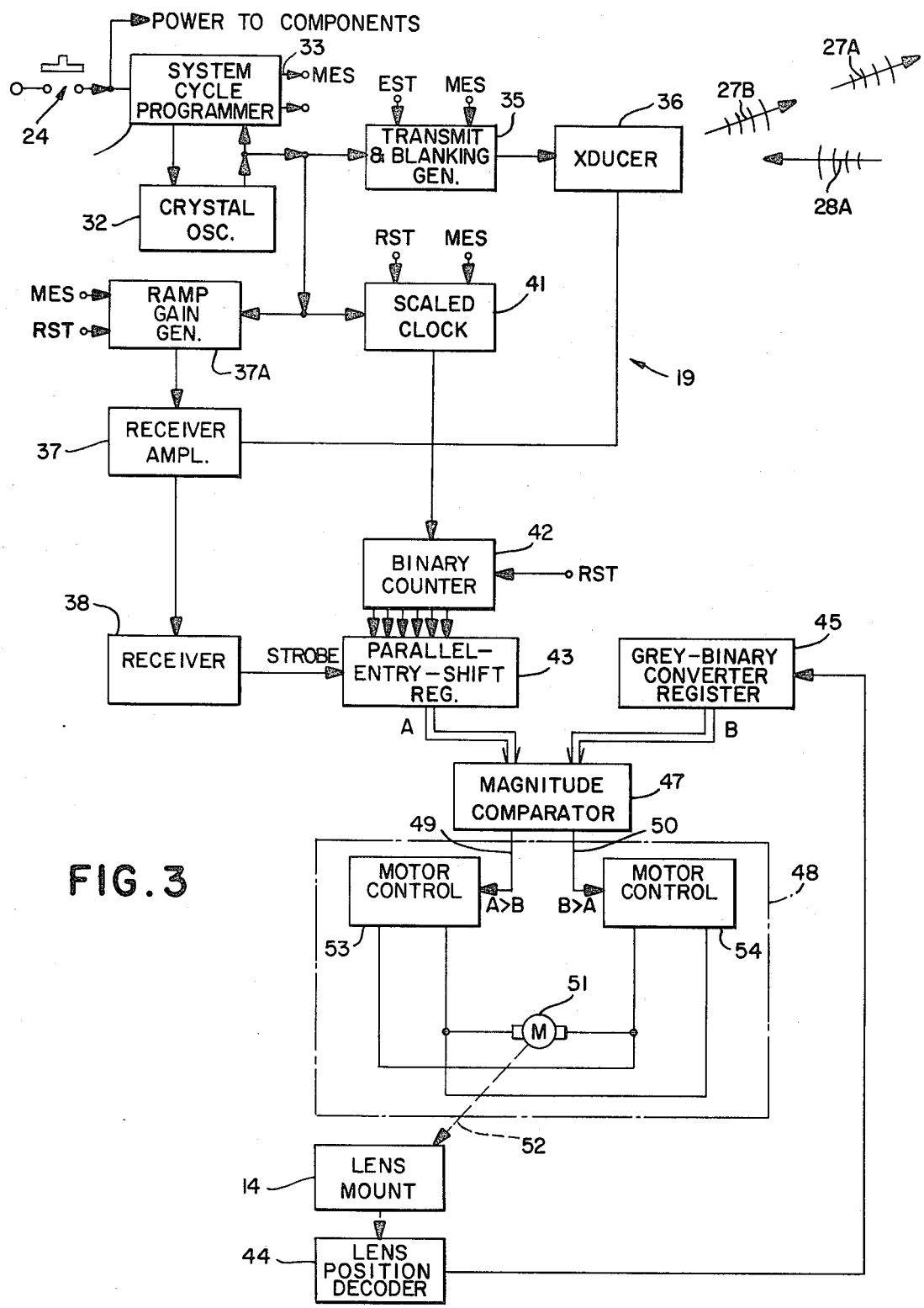
FIG. 3 is a block diagram of one embodiment of the automatic focusing system according to the present invention.

Details of the automatic focus system 19 are shown in FIGS. 3 and 5, to which reference is now made. When the switch 24 is closed, power is applied to the components of the system 19 and causes a system cycle programmer 31 to divide-down the high frequency output of an oscillator 32 into a transmit and reset pulse train having the same pulse repetition frequency, but shifted in phase. The transmit pulse train produced at output 33, which is designated MES, may have a period in the range 100–200 ms; but a pulse repetition frequency from 6–8 cycles per second is preferred (see FIG. 5). The reset pulse train produced at output 34, and designated RST, is delayed with respect to the MES pulses by about 50 ms which is greater than the round trip time for sonic energy, under normal conditions of temperature and pressure, for subjects at a distance of about 24 feet from the camera which represents the hyperfocal lens position. This arrangement will allow any echo from a subject within 24 feet of the camera to be received by the system 19 in the time interval between successive RST pulses (see FIG. 5).

Transmit and blanking generator 35, to which the MES pulses and the output of oscillator 32 are applied, operates similar to the corresponding component in the ultrasonic ranging system disclosed in the copending application Ser. No. 840,802 filed Nov. 11, 1977, now abandoned in the name of Juerg Muggli, which causes the transducer 36 to transmit periodic interrogating bursts, two of which are illustrated at 27A and 27B. An echo from the subject due to the burst 27A, indicated at 28A, is received by the transducer 36 where the echo is routed to a receiver amplifier 37 in the manner described in the copending Muggli application. The amplifier 37 has a ramp gain characteristic controlled by a ramp gain generator 37A to increase the sensitivity of the system to distant subjects. The output of amplifier 37 is detected at a receiver detector 38 to produce an echo pulse (indicated by reference numeral 39 in FIG. 5), such that the time between a transmit pulse 40 (FIG. 5) and its associated echo pulse 39 is proportional to the distance between the subject and camera.

This above-noted time interval is utilized in conjunction with a scaled clock 41 to establish a number representative of the desired focus position of the lens mount 14. As in the parent application, the output of the scaled clock 41 is a train of pulses whose pulse repetition frequency varies with time in the same manner as the time derivative of the lens/subject function. The output of scaled clock 41 is integrated by accumulating the pulses produced by the scaled clock in a binary counter 42; the contents of the counter 42 at any instant representing the integral of the time derivative of the lens/subject function evaluated from the time of transmit pulse 40 to the instant in question. Consequently, the contents of the counter 42, when echo pulse 39 occurs, is the definite integral of the time derivative of the lens/subject function, namely a number representing the focus position of the lens mount 14 for a subject whose distance is determined by the time interval between the transmit pulse 40 and the echo pulse 39.

By means of the detector 38, echo pulse 39 is used to strobe parallel entry shift register 43 to thereby transfer the contents of counter 42, at the instant of the echo pulse 39, into shift register 43. Thus, the transducer 36, the receiver 37, the detector 38, the counter 42 and the register 43 constitute means responsive to the sonic echo for generating a number representing the focus position of the lens mount 14. As shown in FIG. 5, shortly after the sonic echo or the resulting echo pulse 39 occurs, a reset pulse 44 occurs thereby resetting the scaled clock 41 and the binary counter 42 as well as preparing the transmit and blanking generator 35 for the next transmit pulse 40. In addition, the ramp gain generator 37A is reset in preparation for the next transmit pulse which causes the above cycle of operations to repeat again so that upon generation of the next echo pulse 39, the contents of counter 42 are again strobed into register 43. As a consequence, the number in register 43 repeatedly varies in response to changes in subject distance at a rate dependent on the pulse repetition rate of the transmit pulses 40.

Figure 2:
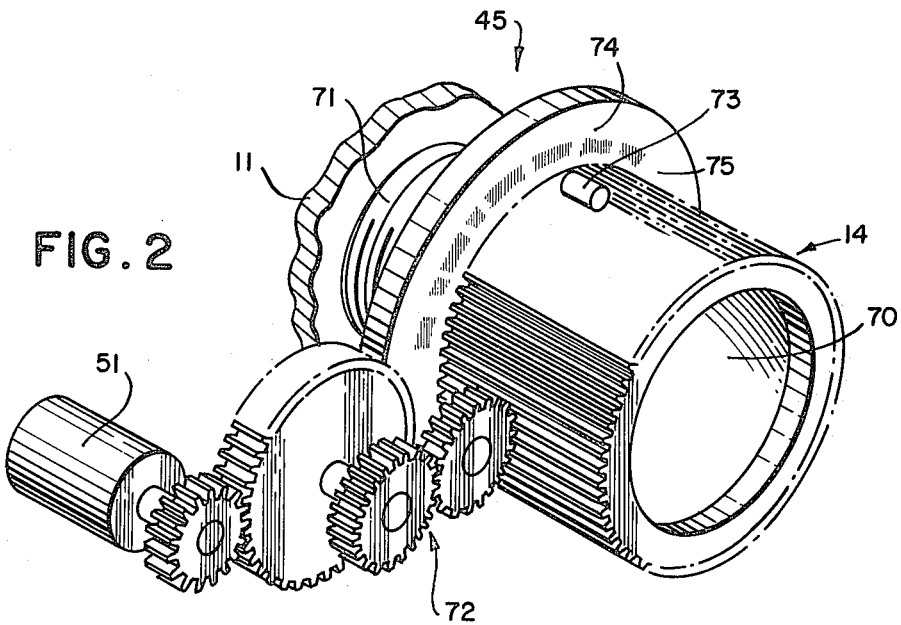
FIG. 2 is a perspective view of a lens mount for a movie camera showing the encoder mechanism by which the position of the lens mount on the camera is converted into a number representative of such position.

For determining the actual position of the lens mount, a lens position decoder 44 which is preferably in gray code and is described in detail with regard to FIG. 2, is provded. Reference is now made to FIG. 2, which shows the preferred form of lens decoder 44. As shown in FIG. 2, lens mount 14 carrying objective lens 70 is rotatably mounted on a threaded member 71 carried by the camera housing 11 so that rotational movement of the lens mount causes axial displacement of lens 70. Actually, the pitch of member 71 is selected such that considerably less than 360° is required to displace the lens from its extreme close-up axial position to its infinity or hyperfocal axial position. In order to rotate the lens mount, a gear train 72 is interposed between the motor 51 and the gear teeth carried by the periphery of lens mount 14. A slip clutch connection (not shown) is interposed between the motor 51 and lens mount 14 to permit overrunning of the motor in the event of a jam or engagement of the lens mount with a stop establishing the limit of axial displacement at either terminal position. Mounted on and rotatable with lens mount 14 is a disc 74, carrying shaft encoding indicia 75 in the form of a gray code. Operatively associated with the indicia are a plurality of photocells one of which is shown at 73 and light sources (not shown) whereby the output of each photocell provides one bit of information on the angular position of the lens mount. A sufficient number of bits is utilized to provide the desired degree of accuracy in determining the linear position of the lens 70.

Turning again to FIG. 3, the output of the decoder 44 is applied to a gray-to-binary converter register 45 which constitutes means responsive to the position of the lens mount for generating a number representative of the actual position of the lens mount.

Continuing now with the operation of the embodiment of FIG. 3, the register 43 is a first register of the system and stores a number representative of the focus position of the lens mount, the contents of this first register varying in response to changes in subject distance at a rate dependent on the pulse repetition rate of the transmit pulses. Note that the distance of the subject is sampled at a relatively high frequency to accommodate movement of human subjects.

The gray-to-binary register 45 constitutes a second register of the system that stores a number representative of the actual position of the lens mount, the contents of this register varying in response to changes in the lens mount position at a rate determined by the rate of change of position. The rate of change of the contents of register 45 is thus independent of the rate at which the contents of register 43 are updated.

The contents of registers 43 and 45 are compared in a magnitude comparator 47 to determine, on a continuous basis, which register contains the larger number. Since each register number is based on the same reference (i.e., the focus position and the absolute position are measured from the same reference point), the contents of the registers will be equal when the actual position of the lens mount corresponds to the focus position. When the contents of one register exceeds the other, the actual position of the lens mount will be displaced from the focus position by an amount equal to the difference between the contents. Whether the actual position is on one side or the other of the focus position will depend, of course, on which register contains the larger number. With knowledge of the existence of a difference in contents as well as identification of the register with the larger number, a drive means 48 is responsive to the output of the comparator means for causing the lens mount 14 to track changes in subject distance.

The comparator 47 has first and second terminals 49 and 50. A signal appears on first terminal 49 only when the contents of the first register 43 exceeds the contents of the number in second register 45. If the numbers in the registers are designated A and B, then a signal will appear on terminal 49 when $A > B$. Ordinarily, a signal will appear on second terminal 50 only when the reverse relationship between the magnitudes occurs, namely $B > A$.

Drive means 48 includes reversible motor 51, operatively asociated with the lens mount 14 through a mechanical connection 52, a forward motor control 53 and a reverse motor control 54. The forward motor control 53 is responsive to a signal on the first terminal 49 for operating the motor in one direction to thereby move the lens mount in one direction so as to increase the number in the register 45 and thereby tending to null the signal on terminal 49. Whether a null condition is reached, however, depends on what is concurrently happening to the contents of the register 43. This, of course, depends on changes in subject distance.

Similarly, a signal on the second terminal 50 causes a reverse motor control 54 to operate the motor 51 in the opposite direction, thereby moving the lens mount in the opposite direction and to thereby decrease the number in the register 45. The movement should tend to nullify the signal on terminal 50 if the subject is stationary. When a signal appears on neither of terminal 49 and 50, neither controls 53 and 54 is operated and motor 51 remains stationary. As indicated above, this condition exists when the actual position of the lens mount corresponds to the focus position for the target subject.

As the subject distance changes, the time intervals between successive transmit pulses 40 and echo pulses 39 change in direct relationship thereby causing strobing of the contents of the counter 42 into the register 43 at a different point in time measured from the beginning of each initiation of operation of the scaled clock 41. The number in the register 43 thus changes and the output of the comparator 47 reflects this change, causing the motor controls 53 or 54 to operate in such a manner as to reduce the difference between the contents of the registers 43 and 45 as the actual position of the lens mount approaches the focus position. Because the position of the lens mount 14 is determined in an absolute manner by reason of the decoder 44, any error that may be introduced during a ranging operation, due to missed or added pulses which affect the contents of the registers 43 and 45, is corrected on a subsequent ranging operation. Thus, errors introduced into the system are self-corrected.

In photographing a moving object at a distance that remains substantially constant during a filming interval, motion of the object may affect the manner in which the sonic interrogation bursts are reflected at which echo pulses 39 occurs with respect to transmit pulses 40. In addition, a subject may change in range slightly during a filming interval but it may not be desirable to track such change to reduce undesirable visual effects when a reproduction of the scene is displayed.

Reduction in hunting of the lens mount 14, and still smoother changes in focusing can be achieved by utilizing the circuitry shown in FIG. 4 which is a modification of the drive means shown in FIG. 3. In FIG. 4, a drive means 48A includes a pair of sample-and-hold means 60 and 61, respectively associated with each of terminals 49 and 50 of the comparator 47. Each of the sample-and-hold means includes a serial entry shift register 62, 63 having a plurality of cells (four are shown, but the number is not important) with an input cell 62A of register 62 connected to the terminal 49 while an input cell 63A is connected to the terminal 50. The state of the input cell of a serial entry shift register is dependent upon the presence or absence of a signal on the terminal connected to the input cell. Shifting of the contents of one cell in the shift registers to an adjacent cell occurs upon the application of a shift pulse to each of the shift registers as shown in FIG. 4. The shift pulses are obtained by delaying echo pulses 39 as indicated in FIG. 5 by means of a delay circuit 65A whose output is the pulse RCD.

As indicated in FIG. 5, the shift pulses 64 are delayed with respect to the echo pulses 39, such delay being of the order of magnitude of 100 ms. Thus, each time the distance of a subject is interrogated and a number representative of the focus position is generated and stored in register 43, the contents of each cell in registers 62 and 63 are transferred. This situation is indicated in the chart of FIG. 6 wherein for a given example, just prior to the first shift pulse, the contents (A) of register 43 exceeds the contents (B) of register 45 with the result that a signal was present in line 49 (the input to register 62) when the first shift pulse occurred. If the state of line 49 when a signal is present is designated ONE, then shift pulse 64 will transfer ONE into cell 62A. FIG. 6 shows the same situation existed when the second shift pulse occurred. However, when the third shift pulse occurred, the contents of registers 43 and 45 were equal. When the fourth shift pulse occurred, the contents of register 45 exceeded the contents of register 43. Finally, when the fifth shift pulse occured, the contents of register 43 exceeded the contents of register 46. When each of these shift pulses occurred, contents of the cell was transferred. Consequently, after the fifth shift pulse occurs, the five cells of the shift register 62 will have the contents listed in column A while the five cells of the shift register 63 will have the contents listed in column B.

A first majority logic gate 65 is associated with the shift register 62 while a second majority logic state 66 is associated with the shift register 63. Each of these logic gates tests the contents of the cells in the registers with which they are associated and produces an output when the majority of the cells in the associated shift register has a given state indicated by the presence of a signal. In other words, the gates 65 and 66 respectively provide a control signal only when the sample-and-hold means has a majority of a predetermined number of samples.

When gate 65 produces a signal, motor control 53 is enabled for causing motor 51 to run in one direction. When gate 66 provides an output, motor control 54 is enabled for causing the motor 51 to run in the opposite direction. By providing a third terminal 67 for comparator 47 for indicating that equality exists between the contents of registers 43 and 46, a signal appearing in terminal 67 can be used to inhibit the motor controls 53 and 54. In this way, the presence of an output on one or the other of gates 65 and 66 cause motor 51 to operate, driving the lens mount 14 in a direction that tends to produce equality in the contents of registers 43 and 45. When equality occurs, the lens mount will be positioned at the focus position and the subject will be in focus. At this instant, an inhibit signal produced in terminal 67 will deenergize motor 51 even while the shift registers 62 and 63 continue to sample and hold the states of terminal 49 and 50. In the absence of terminal 67 and the inhibiting signals applied to controls 53 and 54, motor 51 will tend to overshoot its proper position, and hunting of the lens mount would occur. Under most conditions, this is undesirable and the provision of terminal 67 is preferred.

Since the apparatus of FIG. 4 determines lens movement upon a majority determination of several ranging interrogations, lens movement is not caused by an interfering object in a scene, for example, by an object crossing the subject or scene of interest, or a stationary object such as, for example, a tree during camera sweep of a more distant scene.

Consequently, it should be realized that the receiver, detector 37, 38 and register 43 provide means for generating a range parameter related to subject distance, the lens mount 14 and motor 51 provide means for varying the operation of the camera, or at least the lens assembly thereof, in accordance with subject distance, the grey-binary converter register 45 provide means for providing a camera parameter related to said subject distance, and said magnitude comparator 47 and said motor controls 53 and 54 provide means for comparing said range parameter with said camera parameter and for varying said camera in accordance with the difference determined by said comparing means so as to thereby produce a camera parameter eliminating said difference. Additionally, the shift registers 62 and 63 provide means for repeatedly storing the difference, and the gates 65 and 66 provide means for determining which of said registers has a majority.

It is believed that the advantages and improved results furnished by the apparatus of the present invention are apparent from the foregoing description of the several embodiments of the invention. Various changes and modifications may be made without departing from the spirit and scope of the invention as sought to be defined in the claims that follow.

What is claimed is:

1. In a camera having an adjustable lens for directing scene light onto a focal plane of a recording station when a shutter mechanism is operated, the lens having a predetermined lens/subject function that relates the desired focus position of the lens to the subject distance, and also having range finding means operable for generating a range parameter related to subject distance, the improvement comprising:

a programmer periodically operating the range finding means for generating a range parameter to track changes in subject distance;

first means responsive to the generation of a range parameter for generating a first number representative of the desired focus position of the lens;

a first register for storing said first numbers generated by said first means whereby the contents of this register varies in response to changes in subject distance at a rate dependent on the repetition rate of generation of said range parameters;

second means responsive to the position of the lens for generating a second number representative of the actual position of the lens;

a second register for storing said second number representative of lens position whereby the contents of the second register varies in response to changes in the position of the lens at a rate determined by the rate of change of lens position;

a comparator for comparing the contents of the first and second register, the comparator having first and second terminals, a signal appearing on the first terminal only when the contents of the first register exceeds the contents of the second register, and a signal appearing on the second terminal only when the reverse relationship between the contents occurs;

sample-and-hold means associated with each terminal for sampling and storing the state thereof as determined by the presence or absence of a signal thereon, logic means associated with each sample-and-hold means for producing a control signal when either sample-and-hold means has a majority of a predetermined number of samples in a state indicated by the presence of a signal; and drive means responsive to the output of the comparator for causing the lens to track changes in subject distance, the drive means including a reversible motor operatively associated with the lens, a forward motor control for operating the motor in one direction to thereby move the lens in one direction, and a reverse motor control responsive to a signal on the second terminal for operating the motor in the opposite direction so as to move the lens in its opposite direction, the two motor controls being respectively responsive to the control signals of the sample-and-hold means for operating the motor in a direction that moves the lens mount toward a focus position at which the signals on the terminals are nulled.

2. The improvement of claim 1 wherein the comparator has a third terminal on which a signal appears only when the contents of the first and second registers are equal, a signal on the third terminal serving to inhibit both the forward and reverse motor controls.

3. The improvement of claim 1 wherein the sample-and-hold means associated with each terminal includes a shift register whose input cells are connected to such terminal, the contents of each cell in the shift register being shifted in response to pulses related to the range pulses, and the logic means associated with a shift register being responsive to the states of the cells thereof.

4. In a camera having a range finder operable to periodically generate a range parameter related to subject distance so as to track changes in subject distance, means for varying the operation of said camera in accordance with subject distance, and means for periodically providing a camera parameter related to said camera operation, the improvement comprising:

means responsive to generation of each range parameter for comparing said range parameter with said camera parameter;

means for repeatedly storing a signal in accordance with the difference between said range and camera parameters over a predetermined number of generated range parameters in a first register when said range parameter is greater than said camera parameter and in a second register when said range parameter is less than said camera parameter;

means for determining which of said registers has a majority reading; and means, responsive to said determining means determining that one of said registers holds a majority reading, for actuating said varying means to provide a camera parameter in accordance with a last-generated range parameter and in a direction determined in accordance with which of the said registers holds said majority reading.

5. The improvement of claim 4 wherein said determining means is rendered operative upon generation of each said range parameter.

6. The improvement of claim 4 additionally including means responsive to said comparing means for inhibiting operation of said varying means, regardless of said majority determination, when an equality exists between a last-generated range parameter and a last-provided camera parameter.

7. In a camera having a range finder operable to generate a continuing series of signals each of which corresponds to subject distance so as to track changes in subject distance, means for generating a signal corresponding to the focal distance provided by the camera lens position, and means for selectively moving the camera lens, the improvement comprising:

means for comparing each subject distance signal with the focal distance signal;

means for determining when a majority of a predetermined number of successively generated subject distance signals correspond to subject distances which are greater than or less than the focal distances respectively of the compared lens position signals; and actuating means responsive only to a determination of such a majority within the predetermined number of generated subject distance signals for actuating said lens moving means to position said lens.

8. The camera of claim 7 wherein said actuating means includes means for actuating said lens to a position in correspondence with a last-generated subject distance signal.

9. A method for automatically positioning the lens of a camera to maintain an image of a subject in focus on a focal plane of a recording station comprising the steps of:

periodically determining the range of a subject in a photographic scene in the form of a first number representing the desired lens position for focusing of the subject on the focal plane;

determining the actual position of the lens in the form of a second number;

comparing said first and second numbers after the periodic determination of each first number and storing a signal in a first register when said first number is greater than said second and in a second register when said first number is less than said second;

determining which of the two registers has a majority of stored signals during a predetermined group of successively determined first numbers; and initiating displacement of the lens only when one of said registers is determined to have a majority content.

10. The method of claim 9 including the step of displacing the lens responsive to the initiating displacement step to a position in correspondence with the last produced first number.

11. In a camera having a range finder operable to generate a continuing series of singals each of which corresponds to subject distance so as to track changes in subject distance, means for generating a signal corresponding to the focal distance provided by the camera lens position, and means for selectively moving the camera lens, the improvement comprising:

means for comparing each subject distance signal with the focal distance signal;

means for determining when a majority of a predetermined number of successively generated subject distance signals are greater than or less than the compared lens position signals;

means responsive only to a determination of such a majority within the predetermined number of generated subject distance signals for actuating said lens moving means to position said lens; and means for successively making said determination for different groups of the same predetermined number of subject distance signals wherein each immediately succeeding group of subject distance signals excludes at least the first said signal of the preceding group and includes at least one new subject distance signal not included in said preceding group of range signals.

12. A method for automatically positioning the lens of a camera to maintain an image of a subject in focus on a focal plane of a recording station comprising the steps of:

periodically determining the range of a subject in a photographic scene in the form of a first value representing the desired lens position for focusing of the subject on the focal plane;

determining the actual position of the lens in the form of a second value;

comparing said first and second values after the periodic determination of each first value and storing a signal in a first register when said first value is greater than said second and in a second register when said first value is less than said second;

determining which of the two registers has a majority of stored signals during a predetermined group of successively determined first values; and initiating displacement of the lens only when one of said registers is determined to have a majority content.

13. The method of claim 12 including the step of displacing said lens to a position in correspondence with the last of said first values in said predetermined group.

* * * * *